United States Patent
Lai et al.

(10) Patent No.: US 7,715,560 B2
(45) Date of Patent: May 11, 2010

(54) SYSTEMS AND METHODS FOR HIDING A DATA GROUP

(75) Inventors: Cheng-Shing Lai, Taipei (TW); Steven Wu, Nanking (CN)

(73) Assignee: Inventec Appliances Corp., Taipei (TW)

( * ) Notice: Subject to any disclaimer, the term of this patent is extended or adjusted under 35 U.S.C. 154(b) by 1109 days.

(21) Appl. No.: 10/989,383

(22) Filed: Nov. 17, 2004

(65) Prior Publication Data

US 2006/0104445 A1    May 18, 2006

(51) Int. Cl.
*H04K 1/02* (2006.01)
*G06F 21/00* (2006.01)

(52) U.S. Cl. ............................ 380/252; 713/183
(58) Field of Classification Search ............ 380/252; 713/183
See application file for complete search history.

(56) References Cited

U.S. PATENT DOCUMENTS

| | | | |
|---|---|---|---|
| 6,832,314 B1 * | 12/2004 | Irvin | 713/162 |
| 6,857,072 B1 * | 2/2005 | Schuster et al. | 713/160 |
| 7,328,030 B2 * | 2/2008 | Laursen et al. | 455/466 |
| 7,337,119 B1 * | 2/2008 | Geschwender et al. | 705/1 |
| 7,337,448 B1 * | 2/2008 | Dalia et al. | 719/328 |
| 2001/0054115 A1 * | 12/2001 | Ferguson et al. | 709/248 |
| 2002/0111946 A1 * | 8/2002 | Fallon | 707/9 |
| 2003/0162555 A1 * | 8/2003 | Loveland | 455/502 |
| 2005/0129241 A1 * | 6/2005 | Hardy et al. | 380/270 |
| 2005/0149442 A1 * | 7/2005 | Adams et al. | 705/51 |
| 2006/0041460 A1 * | 2/2006 | Aaron | 705/8 |

\* cited by examiner

*Primary Examiner*—Techane J Gergiso
(74) *Attorney, Agent, or Firm*—Rosenberg, Klein & Lee

(57) ABSTRACT

A system is provided for hiding a data group in a wireless communication device, in which a predetermined data group is hidden according to a hiding request. The system for hiding a data group comprises an encryption module for receiving the hiding request and the predetermined groups in a memory in the wireless communication device and an access module. Next, the encryption module establishes mechanism for hiding a data group to hide the predetermined data group. The access module performs the mechanism for hiding a data group and decrypts a secret code encrypted by the encryption module when data in the predetermined data group is to be read.

15 Claims, 4 Drawing Sheets

SYSTEMS AND METHODS FOR HIDING A DATA GROUP

BACKGROUND OF THE INVENTION (1) Field of the Invention

The present invention pertains to a system and method for hiding a data group in a wireless communication device and particularly to a system and method for hiding a predetermined data group from a plurality of data groups in the wireless communication device.

(2). Description of the Prior Art

With the availability of wireless communication devices such as a mobile phone and a personal digital assistant (PDA), many users thereof may have chances to interchange the devices each other for fun. However, messages or data stored in the wireless communication devices may be private or secret to individuals and which are in conflict with communication device interchanges between users. To those who take secret seriously, the sharing of the communication devices with others may be a troublesome matter. In addition, some important data or messages may also be lost when the wireless communication devices are interchanged with others.

For the currently existing wireless communication devices, the procedure to keep data hidden can only hide and encrypt a set of telephone number of a single individual in the communication book of the communication device a time. When data associated with two or more individuals, a user is required to repeat several times the hiding operations, which seems rather troublesome. Further, the prior hiding procedure can only apply to hide the single set of data of the communication book in the wireless communication device and may do nothing about hiding of other important messages or data in the wireless communication device. Therefore, the prior method of hiding data has poor efficiency in practical use.

In view of this drawback, it is a need to provide a method for hiding and encrypting data stored in the wireless communication device.

SUMMARY OF THE INVENTION

It is therefore an object of the present invention to provide a system and method for hiding a data group at a time so as to improve the disadvantage in the prior art that only one single set of data may be hidden each time.

It is another object of the present invention to provide a system and method for hiding a data group with diverse data types in which not only data recorded in the communication book in the wireless communication device may be hidden but also all data recorded in the same may be hidden.

The present invention relates to a system for hiding data group in a wireless communication device in which a plurality set of data are stored which comprises data associated with individuals in the communication book, schedules, notes and messages and the like and each of the data types may be categorized into a plurality of data groups. The system for hiding a data group may hide a predetermined data group within the plurality of data groups according to a hiding request. The system for hiding a data group comprises an encryption module for receiving the hiding request and selecting the data group in a memory in the wireless communication device appointed or predetermined by the hiding request and then setting mechanism for hiding a data group to hide the predetermined data group and an access module for performing the mechanism for hiding a data group and decrypting a secret code encrypted by the encryption module when data in the predetermined data group is to be read.

Thereby, the present invention may provide protection over the data recorded in the wireless communication device, which not only promote safety of the data in the same but also facilitate the hiding operation by a user.

The advantages and objects of the present invention may be further understood with reference to the following description in detail and the accompanying drawings.

BRIEF DESCRIPTION OF THE DRAWINGS

The present invention will now be specified with reference to its preferred embodiment illustrated in the drawings, in which FIG. 1 is a schematically illustration of a system of hiding a data group according to the present invention and a wireless communication device that the inventive system of hiding data group is applied to;

DESCRIPTION OF THE PREFERRED EMBODIMENT

Figure 1:
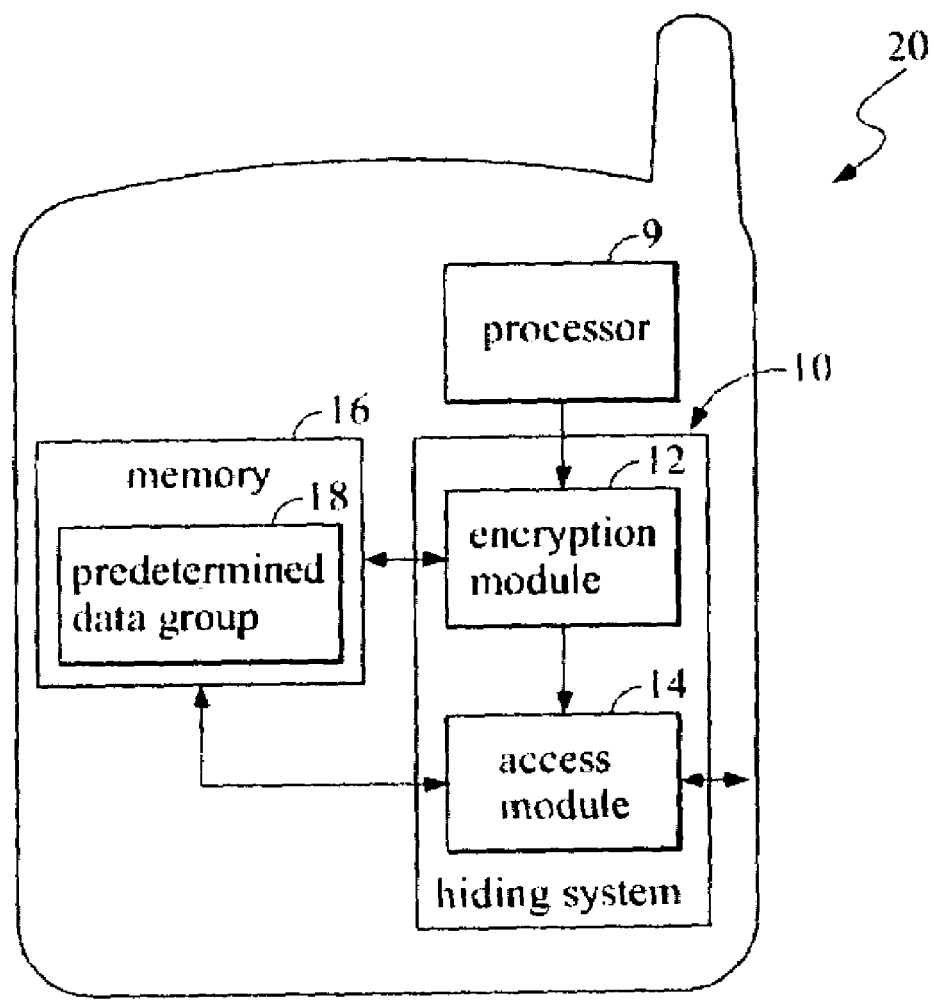

Referring to FIG. 1, it is a schematic diagram of a wireless communication device applied with the present invention. The wireless communication device 20 comprises a memory 16 and a hiding system 10, wherein the memory 16 stores a plurality of sets of data recorded by a user. The plurality of sets of data are further categorized into a plurality of data types. For example, the plurality of sets of data may be categorized into the data associated with individuals in the communication book, schedules, notebooks and messages. As a matter of course, data categorization may take several forms depending on the user's categorization logic. Further, a plurality of sets of data having a specific data type may be categorized into a plurality of data groups. For example, the data associated with a plurality of individuals in the communication book may be categorized into the data associated with relatives, classmates, business affairs, financial affairs and the like. In this manner, a huge of data associated with individuals in the communication book may be efficiently administrated. Likewise, the data associated with other data types may also be categorized.

The hiding system 10 is used to encrypt and hide the categorized data group so that the user of the wireless communication device 20 may protect some data that he would not like to lay open. As shown in FIG. 1, the hiding system 10 comprises an encryption module 12 and an access system 14. The user of the wireless communication device may operate to make an internal processor 9 in the communication device generate a hiding request which comprises the information associated with the to-be-hidden data group appointed by the user (hereinafter, referred to as "the predetermined data group") and the information associated with the address corresponding to the predetermined data group. Thereafter, the hiding request is transmitted to the encryption module 12 through an internal circuit of the wireless communication device. In response to the hiding request, the encryption module 12 first locates a plurality of sets of to-be-hidden data 18 corresponding to the predetermined data group according to the information associated with the address corresponding to the predetermined data included in the hide request. Then, the encryption module 12 establishes a mechanism for hiding a data group to hide the plurality set of to-be-hidden data 18. In an embodiment, the mechanism for hiding a data group is implemented by setting a checkpoint before the plurality of sets of to-be-hidden data 18 are read. Upon a correct secret code for reading received, the checkpoint will be removed and then the plurality of sets of to-be-hidden data 18 may be read. The secret code for reading may be set during the hiding operation or may be a secret code for communication (hereinafter, referred to as communication secret code) having been set in the wireless communication device.

When the mechanism for hiding a data group is done with establishing by the encryption module 12, the access module 14 performs the mechanism for hiding a data group. At normal time, the access module 12 accesses the data stored in the memory 16 upon a request received from the processor 9. However, if the mechanism for hiding a data group has been set and the processor 9 requests the access module 12 to access the predetermined data group and displays them, the access module 12 should perform the mechanism for hiding a data group first. In the preferred embodiment of the present invention, the mechanism for hiding a data group is removed and a reading of the data group hidden is allowed after a secret code for reading is inputted. At this time, the access module 14 may access the data group previously hidden and the successive unit may display them.

Figure 2:
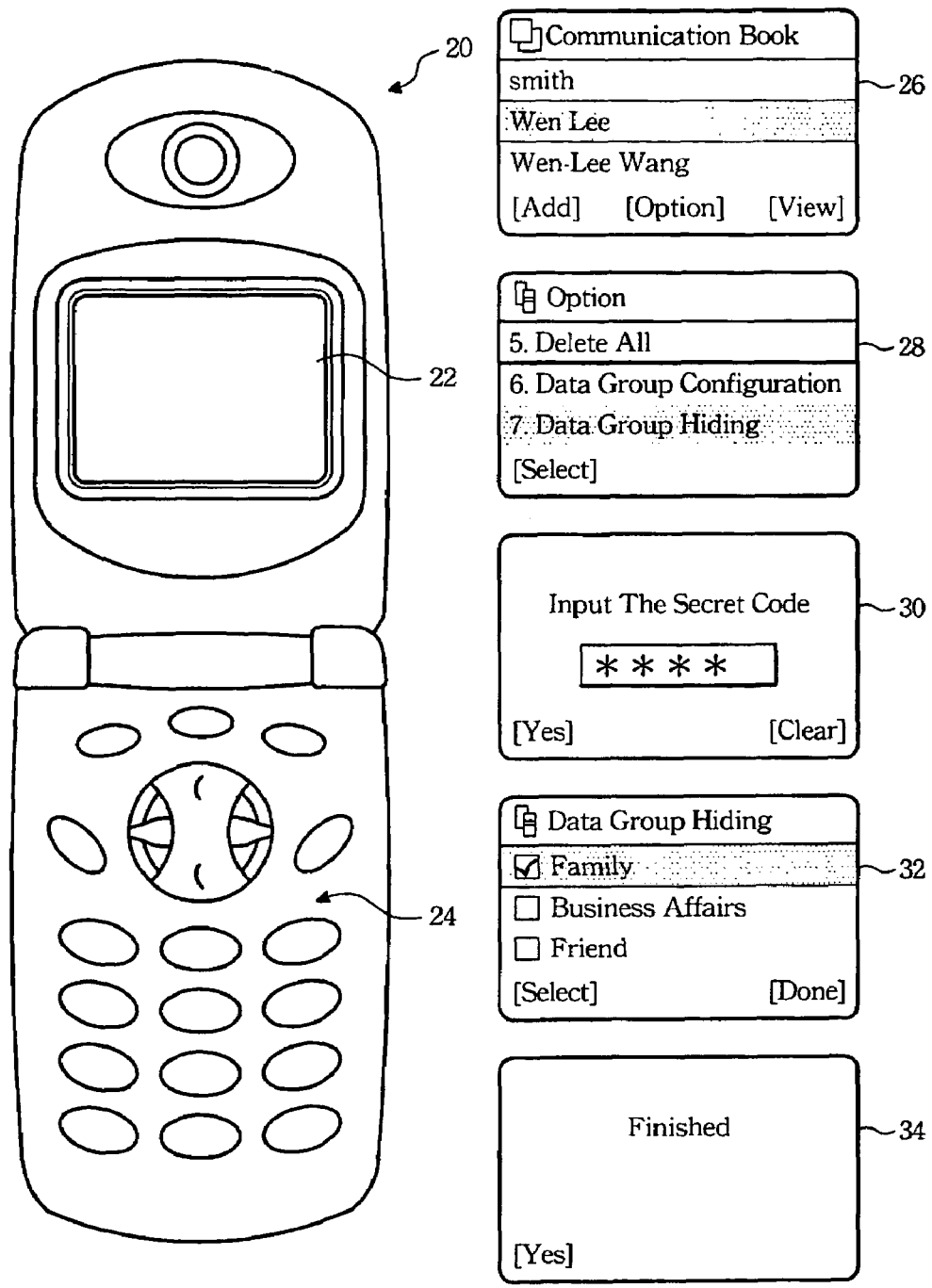
FIG. 2 is a schematically illustration of an operation of hiding a data group as appointed by operating the wireless communication device.

To explain the operation of the hiding system 10 according to the present invention in more detail, the detailed process of hiding a data group in the communication book is described below. Referring to FIG. 2, the operation of hiding a data group by the wireless communication device 20 is illustrated therein. In the wireless communication device 20, there include a displayer 22 and a keyboard 24 besides the components shown in FIG. 1. The displayer 24 is a liquid crystal displayer and used to display the current status of the wireless communication device 20. Further, the displayer 24 serves as an interface of the system 10 so that the user may manipulate the keyboard 24 and select the function through the keyboard 24 he will perform according to the content displayed on the displayer 22. The keyboard 24 comprises the numeral keys 0-9, "*" key, "#" key, direction keys, function keys, "OK" key and "No" key, through which the user may control the wireless communication device 20.

When the user desires to hide some data associated with some individuals in the communication book (physically stored in the memory 16 in the wireless communication device), the user should first enter into the communication book and at this time the frame 26 on the displayer 22 is schematically shown as FIG. 2. In FIG. 2, the tree function keys are "Add", "Option" and "View". In this case, the user should click the "option" key and the current frame 26 will turn to the next frame 28 containing a function of data group hiding, which is also shown in FIG. 2. The user may click the function key "Select" laying at the below-left part of the frame 28 to enter into the option of data group hiding.

Then, the displayer 22 turns to display the frame 30 requesting a secret code primitively built in the wireless communication device to verify the user identification to avoid others' use. If the user does not desire to use the secret code primitively built in the communication device, a function "Setting of The Secret Code for Hiding" may be added as an item of the "Option" and the user may set a new secret code therein, or a function "Setting of the Secret Code for Hiding" may be added into the system configuration in the communication device and the secret code may be the one primitively built in the communication device or a new secret code inputted by the user. When the secret code for hiding is inputted, the next frame 32 shows "Function of Data Group Hiding" as shown in FIG. 2 and the plurality of data groups are shown below the theme "Function of Data Group Hiding".

In the current frame, the below-left block is an "Option" function block and the below-right block is a "Done" function block. When the user selects a data group, the selected data group will be marked before it. At this time, the processor generates an abovementioned hiding request and the hiding request is transmitted into the encryption module 12 in FIG. 1. Then, the encryption module 12 establishes mechanism for hiding a data group to hide the predetermined data group and then the next frame 34 shows the "Finished", meaning the setting for hiding of a data group is finished. Thereafter, when a user desires to view the communication book in the wireless communication device 20, the data group having been subjected to a hiding operation does not show on the displayer 22. When the hidden data group is required to display, a secret code is needed. Only the correct secret code is inputted, will the mechanism for hiding a data group be removed and the data group originally hidden can be showed. In this way, the hiding operation for a data group appointed by the user may be achieved in a simple manner and the hidden data group may be other than only one single data group.

Figure 3:
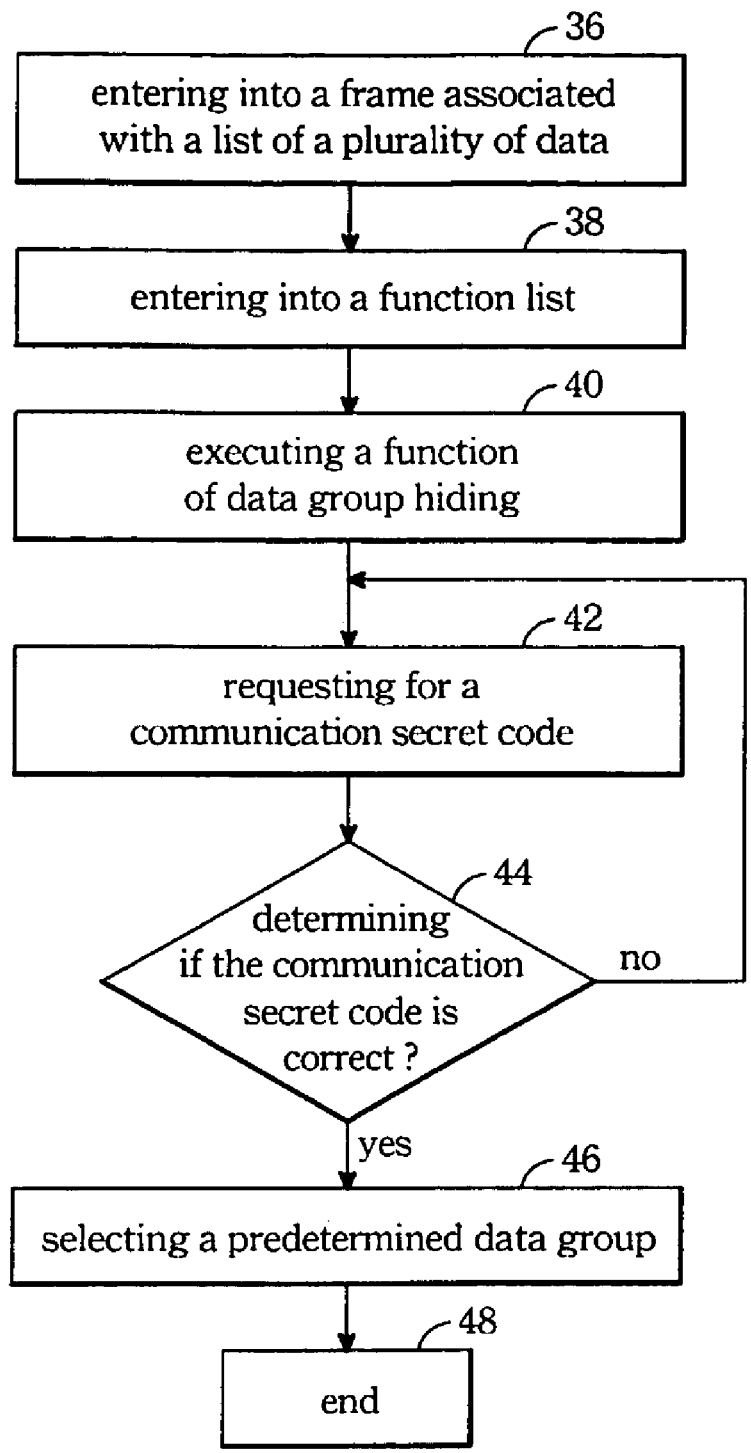
FIG. 3 is a flowchart describing a method of hiding a data group as appointed according to the present application.

Next, a method for hiding a data group in the wireless communication device according to the present invention will be specifically described in conjunction with FIG. 3.

Step 36: entering into a frame associated with a list of a plurality of data.

Step 38: entering into a function list.

Step 40: executing a function of data group hiding in the frame.

Step 42: setting mechanism for hiding a data group by an encryption module and displaying a request for a communication secret code built in the wireless communication device by the frame.

Step 44: determining if the communication secret code is correct, and if correct, proceeding to Step 46, and if not correct, turning back to Step 42.

Step 46: selecting a data group desired to be hidden, such as data groups associated with business affairs, and transmitting a hiding request to the encryption module.

Step 48: end.

In the abovementioned hiding method, the case that the communication secret code is used as the secret code for hiding is explained. In the case of an additional code inputted by the user, a step, Step 39: setting a new secret code for hiding as the secret code for hiding, may be added between Step 38 and Step 40. Alternatively, the system may add a function of secret code setting for hiding before the function associated with Step 36 and the secret code for hiding may be set therein. Alternatively, Step 40 may be performed after Step 46, i.e., verifying an identification of a user before selecting the data group to be hidden.

Figure 4:
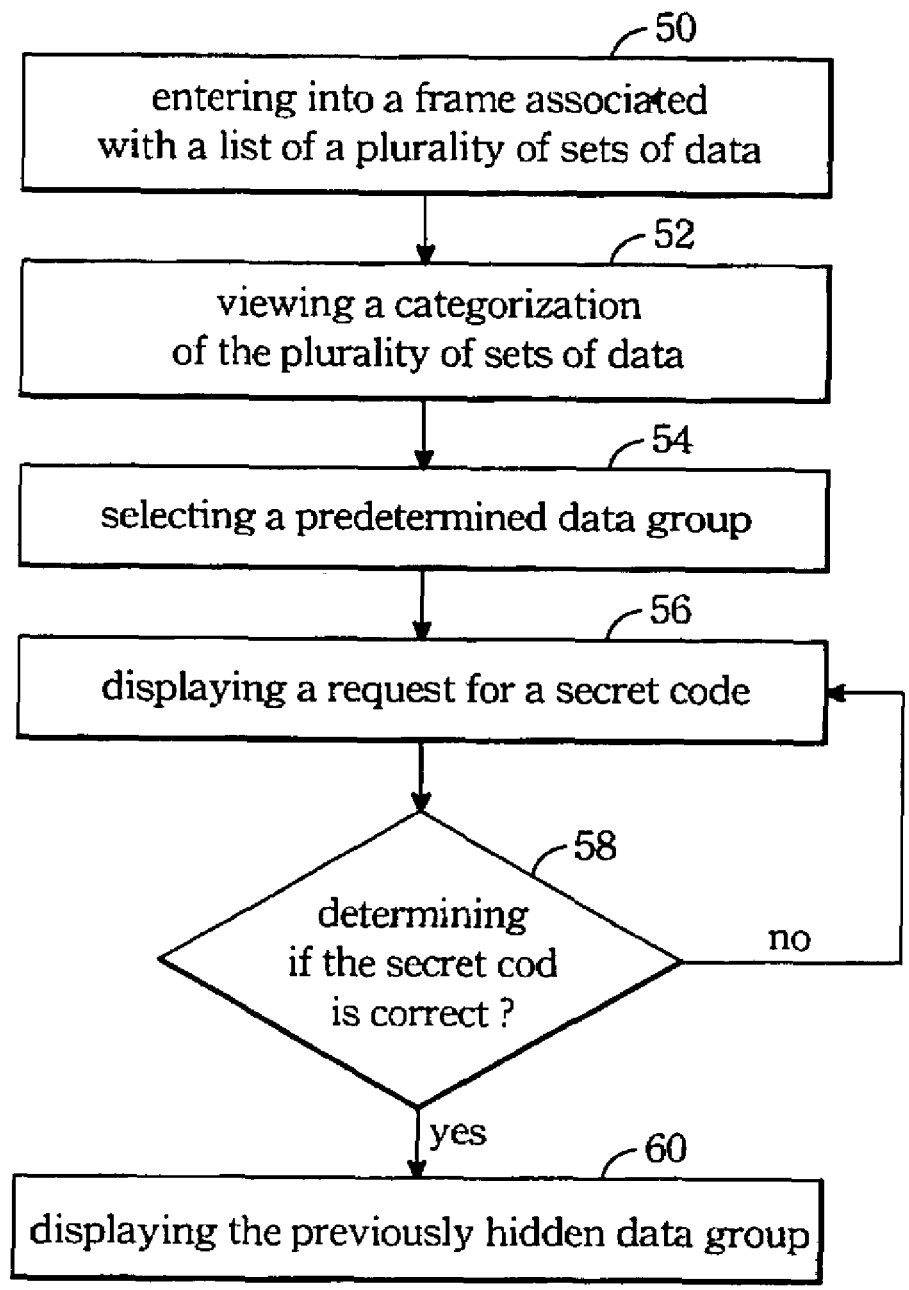
FIG. 4 is a flowchart describing a method of removing mechanism for hiding a data group according to the present invention.

Next, a method for removing the mechanism for hiding a data group according to the present invention is described below. In viewing the description associated with the moving of the mechanism for hiding a data group, referring at the same time to the flowchart shown in FIG. 4.

Step 50: entering into a frame associated with a list of a plurality of data.

Step 52: entering into a categorization function and viewing a categorization of a plurality of sets of data.

Step 54: selecting a data group hidden to be viewed, such as data groups associated with business affairs in a communication book in the wireless communication device.

Step 56: requesting a secret code for reading from a user by an access module according to a checkpoint.

Step 58: determining if the secret cod for reading is correct and if not correct, turning back to Step 56.

Step 60: displaying the previously hidden data group.

In all, the present invention provides a method for hiding data on a data group basis in a wireless communication device. In the wireless communication device, all sorts of data groups may be hidden based on the user selection of the data group to be hidden according to the implementation of the present invention. As compared to the prior art where only one single set of data in the communication book may be hidden, the present invention provides the advantages that the troublesome work due to multiple-times hiding operations in the prior art is avoided, the hiding operation may be facilitated and safety about data protection may be further promoted.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

We claim:

1. A stand-alone wireless communication device for hiding a data group, comprising:
    a processor within said stand-alone wireless communication device for generating a hiding request based on a user input through an input medium;
    a memory within said stand-alone wireless communication device for storing a plurality of sets of data categorized into a plurality of data groups based on categorizations of the data and hiding a predetermined one of the data groups according to the hiding request;
    an encryption module within said stand-alone wireless communication device for receiving said hiding request generated by said processor and setting a mechanism for hiding said predetermined one of the data groups; and
    an access module within said stand-alone wireless communication device for accessing said plurality of sets of data and activating said mechanism for hiding said predetermined one of the data groups;
    wherein said mechanism for hiding said predetermined one of the data groups is removed when the data in said predetermined one of the data groups is subsequently read by the user inputting a secret code in said stand-alone wireless communication device;
    wherein said plurality of sets of data are associated with two or more individuals in a communication book in said stand-alone wireless communication device and said plurality of sets of data are selected from a group consisting of, a plurality of sets of data associated with schedules, a plurality of sets of data associated with notebooks and a plurality of sets of data associated with messages; and
    wherein said plurality of sets of data associated with each individuals in said communication book are further categorized into a family data group, a relative data group, a friend data group, a colleague data group and a business affairs data group.

2. The wireless communication device as recited in claim 1, further including a displayer displaying said data to be selected by the user through a keyboard and generating said hiding request and said keyboard.

3. The wireless communication device according to claim 2, wherein said data in said predetermined one of the data groups subsequently read by the user through the input of said secret code for reading is done through said keyboard and through the displayer displaying said predetermined one of the data groups after said mechanism for hiding said predetermined one of the data groups is removed.

4. The wireless communication device as recited in claim 1, wherein said mechanism for hiding said predetermined one of the data groups further includes a checkpoint for a reading check; before said predetermined one of the data groups is allowed to be read, said checkpoint being removed upon receiving a correct secret code for reading.

5. The wireless communication device as recited in claim 4, wherein said secret code for reading is set by the user.

6. The wireless communication device as recited in claim 4, wherein said secret code for reading is a communication secret code built in said wireless communication device.

7. A method for hiding a data group in a stand-alone wireless communication device, comprising the steps of:
    having a processor within said stand-alone wireless communication device generate a hiding request;
    having a memory within said stand-alone wireless communication device for storing a plurality of sets of data categorized into a plurality of data groups based on respective categorizations of the data and hiding a predetermined one of the data groups according to the hiding request;
    receiving said hiding request;
    selecting said predetermined one of the data groups appointed by said hiding request from said memory; and
    setting a mechanism for hiding said predetermined one of the data groups;
    wherein said mechanism for hiding said predetermined one of the data groups is removed when the data in said predetermined one of the data groups is subsequently read by a user;
    wherein said data in said predetermined one of the data groups subsequently read by the user is done through an input of a secret code for reading through a keyboard and through a displayer displaying said predetermined one of the data groups after said mechanism for hiding said predetermined data group is removed;
    wherein said plurality of sets of data are associated with two or more individuals in a communication book in said stand-alone wireless communication device and said plurality of sets of data are selected from a group consisting of, a plurality of sets of data associated with schedules, a plurality of sets of data associated with notebooks and a plurality of sets of data associated with messages; and
    wherein said plurality of sets of data associated with each individuals in said communication book are further categorized into a family data group, a relative data group, a friend data group, a colleague data group and a business affairs data group.

8. The method as recited in claim 7, wherein said wireless communication device comprises the displayer displaying said data to be selected by the user through the keyboard and generating said hiding request.

9. The method as recited in claim 7, wherein said mechanism for hiding said predetermined one of the data groups sets a checkpoint for a reading check before said predetermined one of the data groups is read and said checkpoint is removed when a correct secret code for reading said predetermined one of the data groups is received.

10. The method as recited in claim 9, wherein said secret code for reading is set by the user.

11. The method as recited in claim 9, wherein said secret code for reading is a communication secret code built in said wireless communication device.

12. The wireless communication device as recited in claim 1, wherein said wireless communication device is a mobile phone.

13. The wireless communication device as recited in claim 1, wherein said wireless communication device is a personal digital assistant.

14. The method as recited in claim 7, wherein said wireless communication device is a mobile phone.

15. The method as recited in claim 7, wherein said wireless communication device is a personal digital assistant.

* * * * *